United States Patent [19]
Zaiser et al.

[11] Patent Number: 5,181,431
[45] Date of Patent: Jan. 26, 1993

[54] AUTOMATIC SHIFTING DEVICE OF A MULTI-PATH TOOTHED-WHEEL GEAR CHANGE BOX

[75] Inventors: Wolfgang Zaiser, Steinheim; Hans Merkle, Stuttgart; Gerhard Wagner, Remseck; Gerhard Spengler, Herrenberg, all of Fed. Rep. of Germany

[73] Assignee: Mercedes-Benz AG, Fed. Rep. of Germany

[21] Appl. No.: 770,864

[22] Filed: Oct. 4, 1991

[30] Foreign Application Priority Data

Oct. 5, 1990 [DE] Fed. Rep. of Germany ....... 4031571

[51] Int. Cl.$^5$ .............................................. F16H 3/08
[52] U.S. Cl. ......................................... 74/333; 74/664; 74/359; 74/665 R; 74/665 P; 192/48.8; 192/87.11
[58] Field of Search ................. 74/333, 334, 335, 359, 74/360, 664, 665 R, 665 P; 192/48.8, 87.1, 87.11

[56] References Cited
U.S. PATENT DOCUMENTS
3,691,861 9/1972 Sturmer ............................ 74/333 X FOREIGN PATENT DOCUMENTS
0083747 7/1983 European Pat. Off. .
3831005 4/1989 Fed. Rep. of Germany .
3926570 2/1991 Fed. Rep. of Germany .

Primary Examiner—Leslie A. Braun
Assistant Examiner—William O. Trousdell
Attorney, Agent, or Firm—Evenson, Wands, Edwards, Lenahan & McKeown

[57] ABSTRACT

A method and apparatus is provided for automatic shifting of a multi-path, toothed-wheel gear change box with at least two gearbox subunits in parallel to one another in the power transmission path between an input shaft and an output shaft and having loose wheels which can be coupled to their shaft in each case by a gearwheel clutch. A starting shift condition is selected if the vehicle is at a standstill, in which condition both the gearwheel clutch connected to the loose wheel of the gearwheel stage of the reverse gear and the gearwheel clutch of that gearwheel stage which forms the lowest of the gears, which are independent of the power-shift clutch of the gearbox subunit with the gearwheel stage of the reverse gear, are engaged.

12 Claims, 3 Drawing Sheets

FIG. 2

| GEAR | POWER-SHIFT CLUTCH | | CONSTANT | GEARBOX SUBUNIT 6 GEARWHEEL STAGE | | | | | GEARBOX SUBUNIT 7 GEARWHEEL STAGE | | | | | DOUBLE GEARWHEEL CLUTCH 19 LOOSE WHEEL | | | DOUBLE GEARWHEEL CLUTCH 20 | | DOUBLE GEARWHEEL CLUTCH 21 | |
|---|---|---|---|---|---|---|---|---|---|---|---|---|---|---|---|---|---|---|---|---|
| | 25 | 26 | 31/32 | 8 | 9 | 10 | 11 | 12 | | | | | 14 | 15 | 27 | 16 | 17 | | 18 |
| I | | O | O | | | | | O | | | | | | | | | | | O |
| II | O | | | | O | O | | | | | | | | | | O | | | |
| III | | O | O | | | | O | | | | | | | | | | O | | |
| IV | O | | | | | | | | | | | | | | O | | | | |
| V | | O | O | | O | | | | | | | | | O | O | | | | |
| R | O | | | O | | | | O | | | | | O | | | | | | O |

FIG. 3

| SELECTION LEVER | DOUBLE GEARWHEEL CLUTCH | | | | | | | | POWER-SHIFT CLUTCH | |
|---|---|---|---|---|---|---|---|---|---|---|
| | 19 | | | 20 | | 21 | | | 25 | 26 |
| | 14 | 15 | 27 | LOOSE WHEEL | | 17 | 18 | | | |
| | 14 | 15 | 27 | 16 | | 17 | 18 | | 25 | 26 |
| P | O | | | | | | O | | | |
| R | O | | | | | | O | | O | |
| N | O | | | | | | O | | | |
| D | | | | O | | | O | | | O |
| 4 | | | | O | | | O | | | O |
| 3 | | | | O | | | O | | | O |
| 2 | | | | O | | | O | | | O |
| 1 | | | | O | | | O | | | O |

AUTOMATIC SHIFTING DEVICE OF A MULTI-PATH TOOTHED-WHEEL GEAR CHANGE BOX

BACKGROUND AND SUMMARY OF THE INVENTION

The present invention relates to an automatic shifting device and method and, more particularly, the type of shifting device used in a multi path, toothed-wheel gear change box having an input shaft and an output shaft which can be brought into driving connection via at least one of at least two gearbox subunits arranged in parallel to one another in the power transmission path by engaging a respectively associated power-shift clutch.

In a starting shift position in a known shifting device shown EP 83 747 A2, the power-shift clutches arranged in the power transmission path between the input shaft and the gearbox subunits are disengaged, whereas both that gearwheel clutch in one gearbox subunit which is connected to the loose wheel of the gearwheel stage of the reverse gear and the gearwheel clutch which is connected to the loose wheel of the gearwheel stage of the lowest of the gears which are independent of the power-shift clutch of this gearbox subunit are engaged. This arrangement is intended to make it possible to "rock" the motor vehicle free when the vehicle becomes stuck due to spinning driving wheels. In other words, rapid switching is permitted between forward and reverse travel simply by alternately engaging the two power-shift clutches which are connected in the power transmission path upstream of the gearbox subunits with their respective engaged gearwheel clutch.

In the known shifting device, however, the starting shift condition with the two engaged synchronizing clutches is provided, on one hand, only in conjunction with the engaged power-shift clutch for the reverse gear and only in conjunction with the reverse-gear position of the gearbox and, on the other hand, only in conjunction with the position of the gearbox in the first gear, and in both cases only in conjunction with manual shifting for the engagement of both synchronizing clutches.

The structure of shifting devices for a multi-path toothed-wheel gear change box generally consists of one power-shift clutch arranged in the power transmission path between the input shaft and each gearbox subunit and of the gearbox subunits with their preferably synchronized gearwheel clutches. If the power-shift clutches are designed as wet multi-plate clutches, the fluid friction between the plates may give rise under certain conditions to high drag torques in the clutches. This risk is present particularly at low ambient temperatures when the vehicle has been stationary for a prolonged period and the temperature of the gearbox oil is far below the normal operating temperature.

In such shifting devices for a multi-path toothed-wheel gear change box, it has hitherto been customary with the vehicle stationary and the engine switched off, for all power-shift clutches and all gearwheel clutches in the gearbox subunits to be disengaged, i.e. no gear is engaged. After starting the engine, it is first necessary to preselect a gear in the relevant gearbox subunit by engaging the frictional synchronizing clutch, which, although connected in parallel in the power transmission path with the customarily positively engaging gearwheel clutch, nevertheless has priority as regards the engagement process. Due to the synchronizing work, a synchronizing torque is introduced into the gearbox subunit set in rotation by the drag torque of the associated power-shift clutch in order to retard the rotating masses to a standstill. The drag torques of the power-shift clutch counteract the synchronizing process. In the case of high drag torques, the available synchronizing torque may not be sufficient for the preselection of the desired gear by engagement of the gearwheel clutch. Under these circumstances, it is impossible to start the vehicle.

An underlying object of the present invention consists essentially in guaranteeing reliable starting under all operating conditions in the case of vehicles with a multi-path, toothed-wheel gear change box.

This object has been achieved in an advantageous manner by a shifting device and method in which the starting shift condition with two engaged synchronizing clutches can be both automatically entered in dependence on a manually actuable selection device and maintained with disengagement of the power-shift clutches when the selection device is moved into a position for interrupting the power transmission path between the input and output shafts or into a position for interrupting the power transmission path between the input and output shafts and firmly braking the output shaft.

At low driving speeds in the case of the shifting device according to the present invention, both the first or second gear and the reverse gear are preselectively engaged in both relevant gearbox subunits by actuating the manual selection member from one of the range selection positions for forward travel into the N position or into the P position or into the R position, and both gears remain engaged while the vehicle is stationary and when the engine is switched off. The neutral position, i.e. the division of the power train between the engine and the output shaft of the toothed-wheel gear change box, is guaranteed by the opening of all power-shift clutches. For starting in reverse gear or in the lowest of the gears which are independent of the power-shift clutch of the gearbox subunit of the reverse gear, the power-shift clutch of the relevant gearbox subunit is engaged.

Depending on the configuration of the gearings in the gearbox subunits, either the first gear or the second gear can be situated in a gearbox subunit which does not have the gearwheel stage of the reverse gear. It is thus possible for the associated gearwheel stage to be preselectively engaged simultaneously for the starting shift condition in the driving connection between the associated power-shift clutch and the output shaft together with the gearwheel stage of the reverse gear.

In the case of the shifting device according to the present invention, the gearbox control operates such that the gearwheel clutches of the two preselected gears remain engaged and are not mechanically disengaged after the engine has been switched off.

BRIEF DESCRIPTION OF THE DRAWINGS

These and other objects, features and advantages of the present invention will become more apparent from the following detailed description of a currently preferred embodiment when taken in conjunction with the accompanying figures wherein:

FIG. 2 is a shifting table of the shifting device acting in the individual gears in the toothed-wheel gear change box of FIG. 1; and FIG. 3 is a table of the starting shift condition with reference to the shifting device acting in the individual selection ranges of the automatic shifting device of the toothed-wheel gear change box of FIG. 1.

DETAILED DESCRIPTION OF THE DRAWINGS

Figure 1:
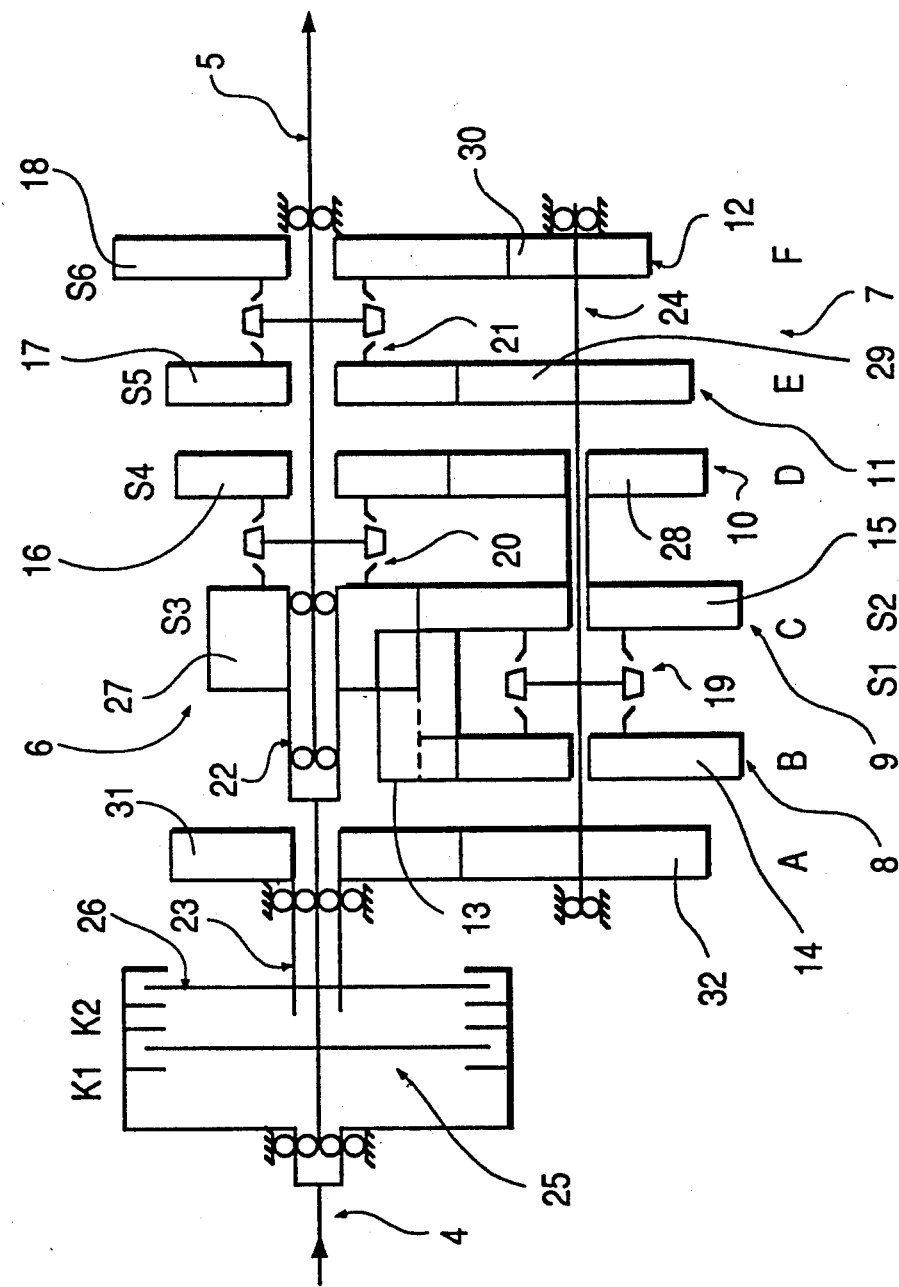
FIG. 1 is a gearbox schematic of a two-path, toothed-wheel gear change box using the shifting device according to the present invention.

Referring to FIG. 1, an input shaft 4 and a coaxial output shaft 5 are connected to one another by two gearbox subunits 6 and 7 which are parallel to one another in terms of power transmission and, as a special feature, have a common countershaft 24 which is parallel to the two first shafts 4 and 5. Gearbox subunit 6 has a main shaft 22 which is coaxial to the input shaft 4 and is connected firmly to a common main-shaft gearwheel 27 of two front gearwheel stages 8, 9. The main shaft 22 is also connected to the input shaft 4 by a power-shift clutch 25. Gearwheel stage 8 has an intermediate gearwheel 13 rotatably mounted on a fixed axle and a loose wheel 14 rotatably mounted on the countershaft 24. The intermediate gearwheel 13 meshes both with the main-shaft gearwheel 27 and with the loose wheel 14. It is possible for the loose wheel 14 to be coupled to the countershaft 24 by a conventional double gearwheel clutch 19.

Gearwheel stage 9 has a loose wheel 15 which likewise meshes with the main-shaft gearwheel 27 and can also be coupled to the countershaft 24 by the double gearwheel clutch 19, although optionally in relation to loose wheel 14. In addition to the two gearwheel stages 8 and 9, gearbox subunit 6 has a third gearwheel stage 10, which operates with a countershaft gearwheel 28 mounted rotatably on the countershaft 24. The countershaft gearwheel 28 is connected to loose wheel 15 so as to be fixed against motion, meshes with a loose wheel 16 mounted rotatably on the output shaft 5 and, for its part, can be coupled by a conventional double gearwheel clutch 20 to the output shaft 5. The double gearwheel clutch is further used for optionally coupling the main-shaft gearwheel 27 to the output shaft 5.

The other gearbox subunit 7 has a hollow gearbox shaft 23 concentric to the main shaft 22 and connected, on one hand, to the input shaft 4 by a power-shift clutch 26 and, on the other hand, firmly connected to a main-shaft gearwheel 31 which is in continuous mesh with a countershaft gearwheel 32 arranged in torsionally rigid fashion on the countershaft 24. The main-shaft gearwheel 31 and countershaft gearwheel 32 together form a constant stage. The gearbox subunit 7 operates with two gearwheel stages 11 and 12, each of which has a countershaft gearwheel 29 and 30, respectively, seated in torsionally rigid fashion on the countershaft 24 and meshing with a corresponding loose wheel 17, 18, respectively, on the output shaft 5. The loose wheels 17, 18 can be optionally coupled to the output shaft 5 by a conventional double gearwheel clutch 21.

Referring to FIG. 2, five forward gears I to V and one reverse gear R are formed in the toothed-wheel gear change box of FIG. 1 as follows. By engaging the power-shift clutch 25, gears II, IV and R are formed in the gearbox subunit 6, which is thereby driven, with the double gearwheel clutch 20 coupling the loose wheel 16 of gearwheel stage 10 to the output shaft 5 in second gear and, coupling the main shaft gearwheel 27 to the output shaft 5 in fourth gear; in reverse gear R, the loose wheel 14 of gearwheel stage 8 is connected by the double gearwheel clutch 19 to the countershaft 24 and the loose wheel of gearwheel stage 12 is connected by double gearwheel clutch 21 to the output shaft 5.

By engaging the power-shift clutch 26, gears I, III and V are formed in the gearbox subunit 7 which is thereby driven. A special feature of this configuration is that the fifth gear makes simultaneous use of gearwheel stage 9 of the other gearbox subunit 6. In first gear, the double gearwheel clutch 21 connects the loose wheel 18 of the gearwheel stage 12 to the output shaft 5, and, in third gear, connects the loose wheel 17 of the gearwheel stage 11 to the output shaft 5; in fifth gear, the main-shaft gearwheel 27 of the gearwheel stage 9, which in this situation is driven via the constant stage 31/32, is coupled to the output shaft 5 by the double gearwheel clutch 20.

The starting shift condition according to the present invention is readily apparent from FIG. 3. When the vehicle is at a standstill or at a very low driving speed, in selector level positions P for braking the output shaft 5 firmly with positive engagement while the power transmission path in the toothed-wheel gear change box is interrupted, R for selecting the reverse gear and N for interrupting the power transmission path between the input shaft 4 and the output shaft 5, both the loose wheel 14 of gearwheel stage 8 for the formation of the reverse gear R in the gearbox subunit 6 by engagement of the double gearwheel clutch 19 and the loose wheel 18 of gearwheel stage 12 for the formation of the first gear in the gearbox subunit 7 by engagement of the double gearwheel clutch 21 are each connected to their respective shaft 24, 5. Here, the gearwheel stage 12 is used not only to form the lowest of the gears which are independent of the power-shift clutch 25 of the other gearbox subunit 6 but also of the lowest gear I overall. The first gear thus also serves as a starting gear from the starting shift condition mentioned.

In the remaining selection range positions D-4-3-2-1 of the automatic shifting device, i.e. in the positions associated with forward travel of the vehicle, the double gearwheel clutch 19 is disengaged into its neutral central position, in which both loose wheels 14 and 15 are decoupled. The double gearwheel clutch 20 has been, however, preselectively engaged in the position in which it couples the loose wheel 16 of gearwheel stage 10 to the output shaft 5 to form the second gear. In this instance the second gear is the lowest of the forward gears II and IV which are independent of the power-shift clutch 26 of the other gearbox subunit 7.

It is also essential for the starting shift condition according to FIG. 3 that both power-shift clutches are disengaged in selection range positions N and P while, upon selection of selection range position R, the power-shift clutch 25 which brings the gearbox subunit 6 with the gearwheel stage 8 for the formation of reverse gear into driving connection with the input shaft 4 is, of course, engaged.

It is furthermore very important that when starting in the direction of forward travel, i.e. when the manual selection member is actuated in the starting shift condition into one of the selection range positions D-4 3-2-1 associated with forward travel, this actuation necessarily leads to the engagement of that power-shift clutch 26 which lies between the input shaft 4 and that gearbox subunit 7 which has the loose wheel 18 which is coupled in the starting shift condition to its shaft (output shaft 5) and belongs to the gearwheel stage 12 of the lowest (I) of the gears (I, III and V) which are independent of the power-shift clutch 25 of the gearbox subunit 6 having the gearwheel stage 8 of the reverse gear. This clutch control upon starting is likewise readily apparent from the table of FIG. 3.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An automatic shift device of a multi-path toothed-wheel gear change box having an input shaft and an output shaft configured to be brought into driving connection via at least one of at least two gearbox subunits operatively arranged in parallel to one another in a power transmission path by engaging a respectively operatively associated power-shift clutch, comprising preselectively engageable synchronizing clutches, gearwheel stages operatively associated with the gearbox units having a loose wheel configured to be coupled to its shaft by one of the preselectively engageable synchronizing clutches such that a starting shift condition can be produced in which both the synchronizing clutch of the gearwheel stage for the formation of a reverse gear and the synchronizing clutch of the gearwheel stage for the formation of a lowest of forward gears which is independent of the power-shift clutch of one of the gearbox subunits with the gearwheel stage for the formation of the reverse gear are engaged, and the starting shift condition with engaged synchronizing clutches can be both automatically entered in dependence on a manually actuable selection device and maintained with disengagement of the power-shift clutches when the selection device is moved into a position for interrupting the power transmission path between the input shaft and the output shaft or into a position for interrupting the power transmission path between the input shaft and the output shaft and firmly braking the output shaft.

2. The automatic shifting device according to claim 1, wherein the device is configured such that the starting shift condition is canceled above a fixed, relatively low speed value of the speed of the output shaft.

3. The automatic shifting device according to claim 1, wherein the device is configured such that the starting shift condition is maintained while an associated engine is off.

4. The automatic shifting device according to claim 1, wherein the device is configured such that the starting shift condition is maintained while the output shaft is not rotating.

5. A method for producing a starting shift position with an automatic shift device of a multi-path toothed-wheel gear change box having an input shaft and an output shaft configured to be brought into driving connection via at least one of at least two gearbox units arranged in parallel to one another in a power transmission path by engaging a respectively operatively associated power-shift clutch, comprising the steps of:

engaging both a first synchronizing clutch of a gearwheel stage for forming a reverse gear and a second synchronizing clutch of another gearwheel stage for the formation of a lowest forward gear which is independent of one of the power-shift clutches of one of the gearbox units with the gearwheel stage for the formation of the reverse gear;

automatically entering the starting shift condition with the engaged synchronizing clutches in dependence on a manually actuable selection device; and maintaining with disengagement the power-shift clutches when the selection device is moved into a position for interrupting the power transmission path between the input shaft and the output shaft or into another position for interrupting the power transmission path between the input shaft and the output shaft and formally braking the output shaft.

6. The method according to claim 5, wherein the starting shift condition is canceled above a fixed, relatively low value of the speed of the output shaft.

7. The method according to claim 5, wherein the starting shifting condition is maintained when an associated engine is off.

8. The method according to claim 7, wherein the starting shift condition is canceled above a fixed, relatively low value of the speed of the output shaft.

9. The method according to claim 5, wherein the starting shift condition is maintained when the output shaft is stationary.

10. The method according to claim 9, wherein the starting shift condition is canceled above a fixed, relatively low value of the speed of the output shaft.

11. The method according to claim 9, wherein the starting shifting condition is maintained when an associated engine is off.

12. The method according to claim 11, wherein the starting shift condition is canceled above a fixed, relatively low value of the speed of the output shaft.

* * * * *